UNITED STATES PATENT OFFICE.

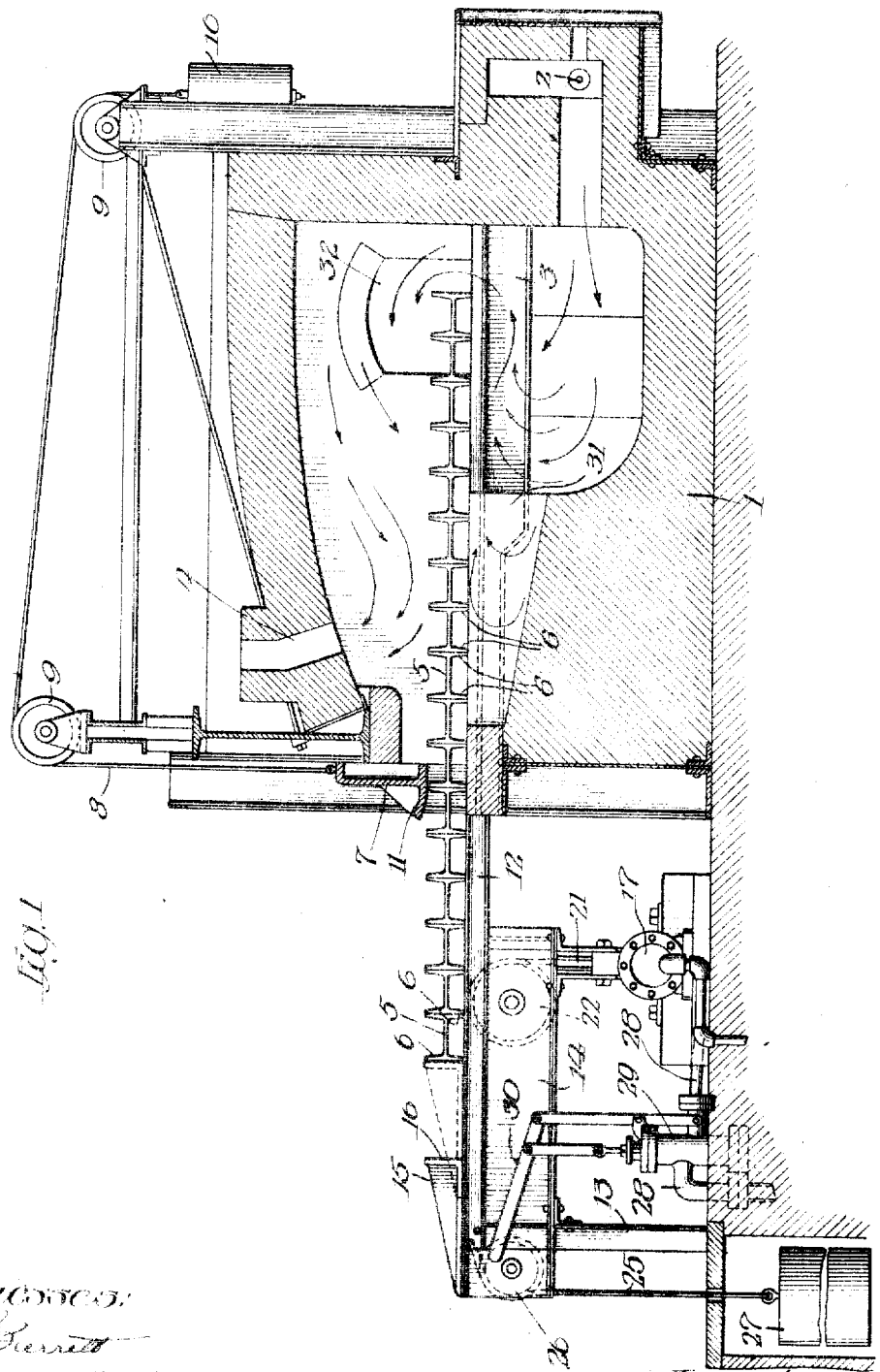

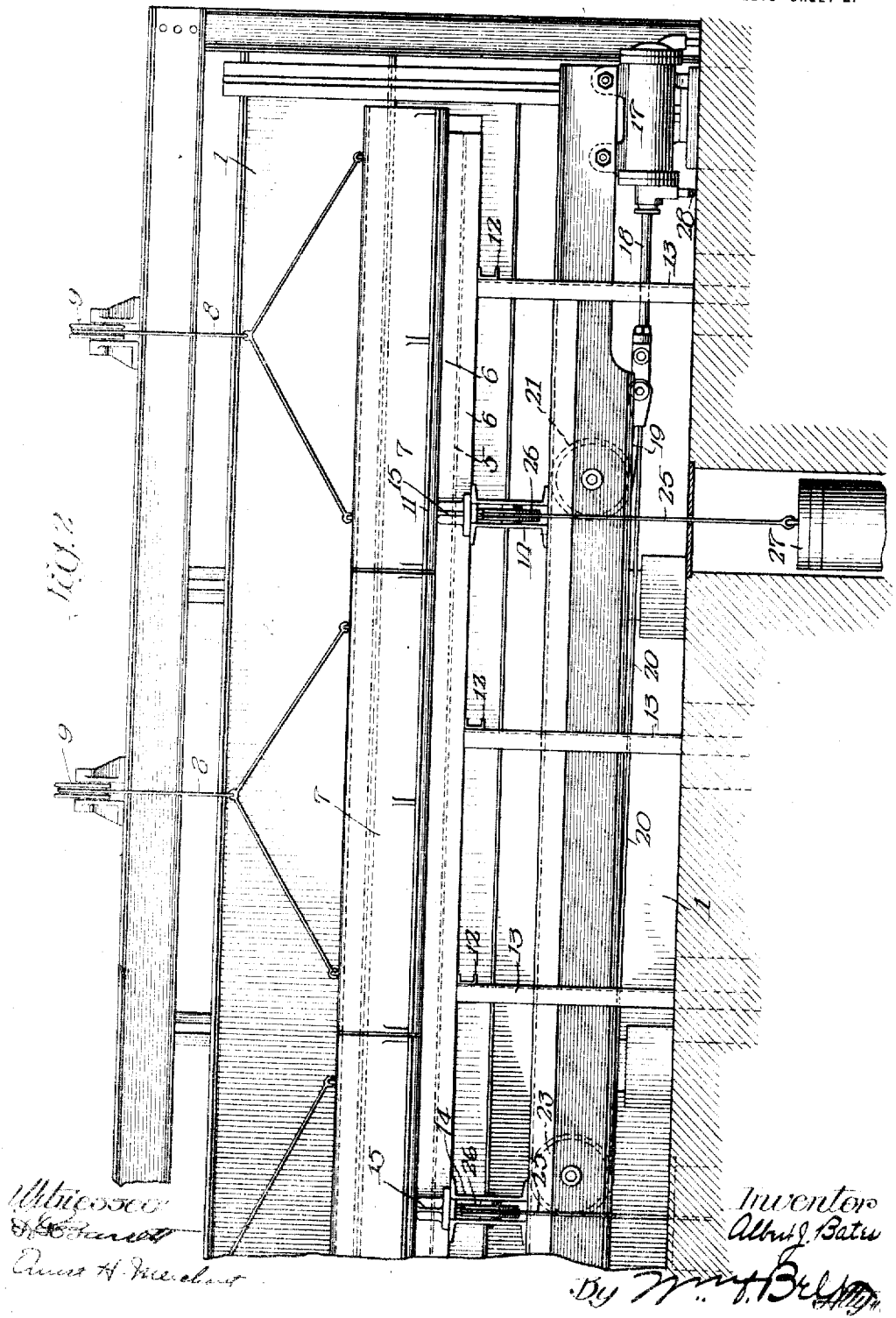

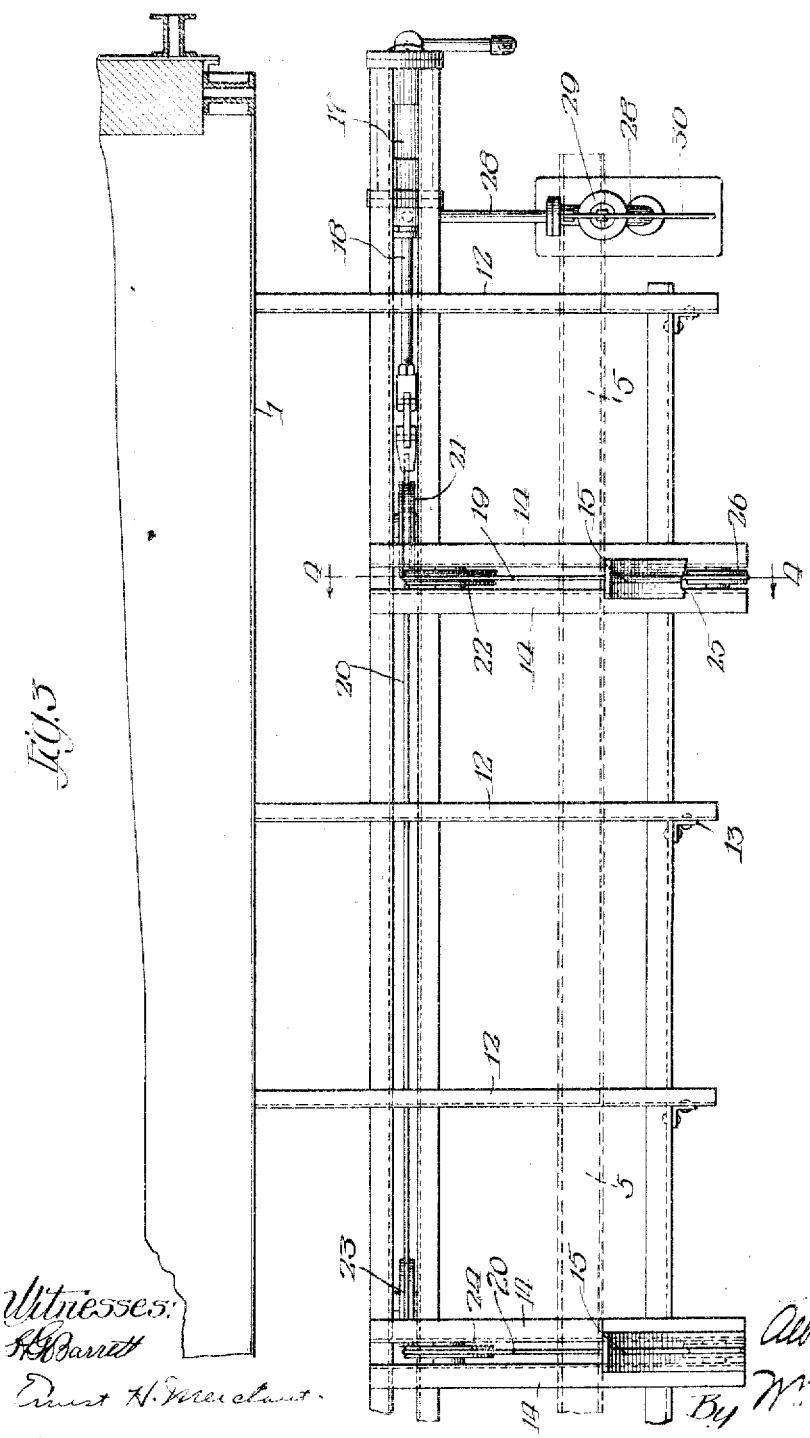

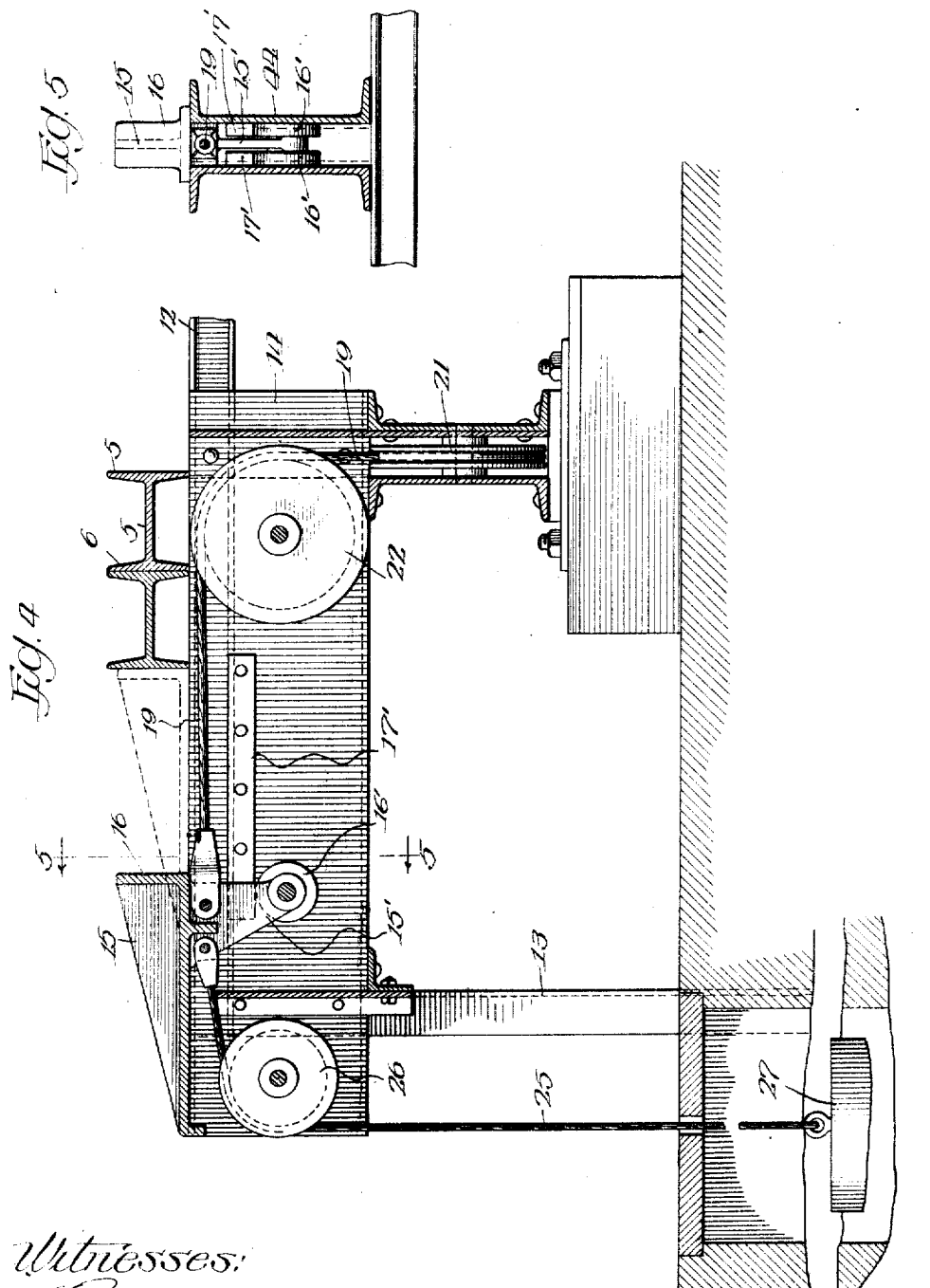

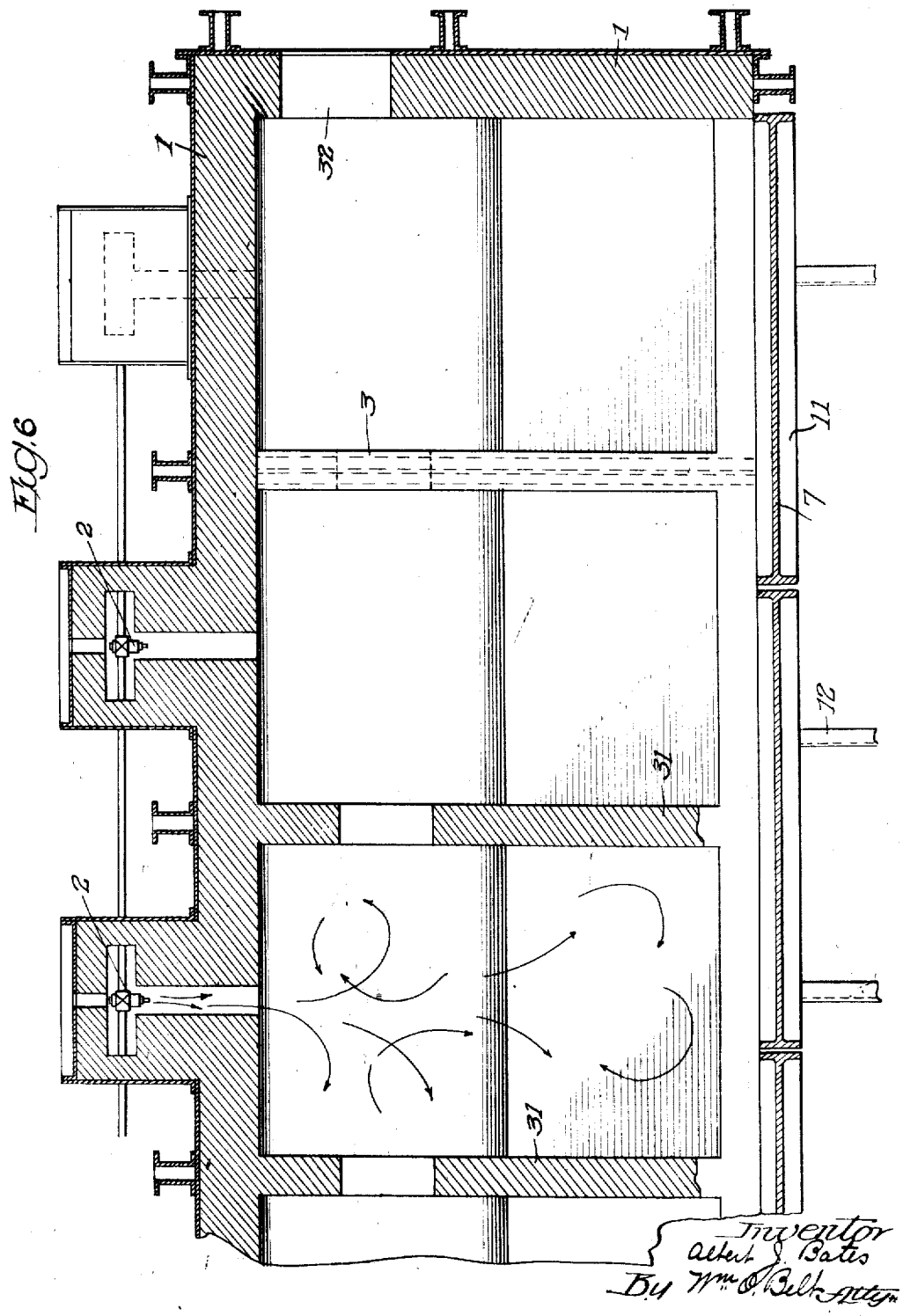

ALBERT J. BATES, OF CHICAGO, ILLINOIS, ASSIGNOR TO BATES EXPANDED STEEL TRUSS CO., OF WILMINGTON, DELAWARE, A CORPORATION OF DELAWARE.

HEATING-FURNACE.

1,268,080.

Specification of Letters Patent.

Patented June 4, 1918.

Application filed December 22, 1915. Serial No. 68,147.

*To all whom it may concern:*

Be it known that I, ALBERT J. BATES, a citizen of the United States, residing at Chicago, in the county of Cook and State of Illinois, have invented certain new and useful Improvements in Heating-Furnaces, of which the following is a specification.

This invention relates to the art of treating metals and has for its principal object the provision of a method of and apparatus for heating metallic members, whereby the webs thereof may be heated to a sufficiently high temperature for further treatment while the flanges are retained in a relatively cool condition.

A further object of my invention is the provision of means whereby the members to be heated are fed successively to the heating means and are subjected to progressively higher temperatures as they are advanced.

Still further objects of my invention are the provision of a furnace in which the members to be heated act as a baffle for the heating gases so that the greatest efficiency of the furnace is assured and the provision of simple and effective means for successively feeding the members to be heated to and through the furnace.

Other objects and advantages of my invention will be apparent as it is better understood by reference to the following specification when read in connection with the accompanying drawing illustrating a preferred embodiment thereof in which—

Figure 1 is a transverse vertical section through the furnace and feeding means;

Fig. 2 is a side elevation of a portion of the furnace and feeding means;

Fig. 3 is a plan view, partially in section of the structure illustrated in Fig. 2;

Fig. 4 is a vertical section on the line 4—4 of Fig. 3;

Fig. 5 is a vertical section on the line 5—5 of Fig. 4, and

Fig. 6 is a horizontal section through a portion of the furnace.

Referring to the drawing, 1 indicates a suitable furnace structure providing a chamber into which heating gases are projected from a plurality of sources of such gases, such for example as the burners 2 adapted to consume oil or gas. Within the chamber in the furnace 1 a skeleton hearth is arranged comprising a plurality of transverse supporting rails 3 extending across the chamber. An outlet 4 for the gases is provided in the roof of the furnace. In the wall of the furnace 1 opposite the burners a longitudinal opening is provided through which opening the members to be heated may be moved into the chamber with their webs 5 horizontally disposed and their flanges 6 abutting and resting upon the rails 3 constituting the skeleton hearth. A plurality of closures 7 are hung on flexible members 8 adjacent the opening in the wall of the furnace 1 and are adapted to coöperate with the flanges 6 of the members to be heated as they enter the furnace to close the opening. The flexible members 8 pass over pulleys 9 rotatably mounted above the furnace 1 and weights 10 are secured to the ends of the flexible members 8 to balance the weight of the closures 7 so that the lower edges 11 of the closures 7, which, as will be seen from an inspection of Fig. 1, are curved upwardly and outwardly, will rest lightly on the flanges 6 of the members to be heated.

A support is provided for the members to be heated outside the furnace and substantially in the plane of the skeleton hearth which comprises a plurality of rails 12 supported in any suitable manner as by the angle bars 13. Mounted in suitable guideways 14, adjacent both ends of the support for the members to be heated, are slides 15 having vertical faces 16 adapted to coöperate with the flanges 6 of the members to be heated. The slides 15 have downwardly extending arms 15' provided with rollers 16' which coöperate with the rails 17' secured to the inner faces of the guideways 14. A hydraulic cylinder 17 is provided with a piston rod 18 to which the ends of cables 19 and 20 are secured, the cable 19 passing over pulleys 21 and 22 and connecting at its opposite end with one of the members 15 and the cable 20 passing over pulleys 23 and 24 and connecting at its opposite end with the other of the members 15. Cables 25 connect with the members 15, pass over pulleys 26 and are provided at their extremities with weights 27 which normally maintain the members 15 in the position indicated in full lines in Figs. 1 and 4.

The hydraulic cylinder 17 is supplied with water under pressure from any suitable source through a pipe 28 in which is disposed a valve 29 having an operating handle 30, whereby water may be admitted to the cylinder 17 by the operator at will.

Beneath the skeleton hearth formed by the rails 3 an enlarged combustion chamber is formed which extends longitudinally through the furnace and to a point about midway transversely thereof. Transverse partition walls 31 divide the remaining space beneath the skeleton hearth and the bottom of the furnace is so formed as to restrict the passage of gases into the space beneath the members to be heated so that the members as they enter the chamber are protected from the full heat of the heating gases. As will be readily understood from an inspection of Fig. 1 of the drawing the members to be heated form a baffle in the chamber, the heating gases passing from beneath around the leading member and above the members to the outlet 4. The members to be heated are thus subjected to an increasing temperature as they advance. Openings 32 in the end walls of the furnace are provided through which the members, when fully heated, can be withdrawn endwise for further treatment.

The method of heating the webs of flanged members, as employed by me, comprises arranging a plurality of members within the furnace chamber with their webs horizontal and their flanges abutting and causing the heating gases to pass above and beneath the members, subjecting the members as they are advanced in the furnace to an increasing temperature, all of the members in the furnace being advanced step by step.

The operation of my furnace and feeding means in carrying out this method should be apparent without further description of the structure thereof. The members to be heated are arranged as indicated in the drawing on the rails 12 and by operating the handle 30 the slides 15 are caused to move in the guideways 14 to advance the members toward the opening in the side wall of the furnace. As soon as the members have entered the furnace chamber heating gases are admitted and the members are advanced step by step until one is in position to be withdrawn through the opening 32. By this time the web 5 of the member will have been thoroughly heated to the desired temperature but owing to the greater thickness of metal in the flanges 6 and the fact that the flanges of adjacent members abut, the temperature of these portions of the members will be much lower than that of the web. As soon as a member is withdrawn from the furnace for further treatment another member is placed on the rails 12 and the slides 15 are actuated to advance the members to be heated along the rails 12 and the rails 3 forming the skeleton hearth.

It will be readily understood from the foregoing that I have perfected a method of and apparatus for heating metallic members in which the members themselves form a baffle for the heating gases and whereby the webs may be heated to the desired temperature without unduly heating the flanges.

It will be obvious that various changes may be made in the form, construction and arrangement of the parts without departing from the spirit and scope of the invention or sacrificing any of its material advantages, the form hereinbefore described being merely a preferred embodiment thereof.

I claim:

1. A heating furnace comprising an elongated chamber, a skeleton hearth within said chamber for supporting members to be heated, whereby said members form a baffle, means for directing heating gases into said chamber beneath said skeleton hearth, means for partially protecting members at one side of said chamber from the heat of said gases, means above said hearth to allow said gases to leave said chamber, a support for said members outside said chamber in substantially the plane of said skeleton hearth, and means for simultaneously advancing all of the members on said support and skeleton hearth.

2. A heating furnace comprising a chamber, means within said chamber to support a plurality of members to be heated whereby they form a continuous baffle extending from the rear to a point short of the front thereof, means in the front of the chamber to direct the flame toward the rear thereof, and means in said chamber to deflect the flame toward the front along one side of the members being heated, around the forward end thereof, and toward the rear and along the other side of the members.

3. A heating furnace comprising a chamber, means within said chamber to support a plurality of members to be heated whereby they form a continuous baffle extending from the rear to a point short of the front thereof, means in the front of the chamber to direct a flame toward the rear thereof, means in said chamber to deflect the flame toward the front along one side of the members being heated, around the forward end thereof, and toward the rear and along the other side of the members, and means at the rear of the chamber for choking the passage of gases rearwardly beneath a portion of the baffle formed by said members.

ALBERT J. BATES.

Witness:
M. A. KIDDIE.